G. W. VAN HORNE & C. L. VIBBARD.
BALL AND SOCKET JOINT.
APPLICATION FILED MAR. 22, 1916.
1,201,115.
Patented Oct. 10, 1916.
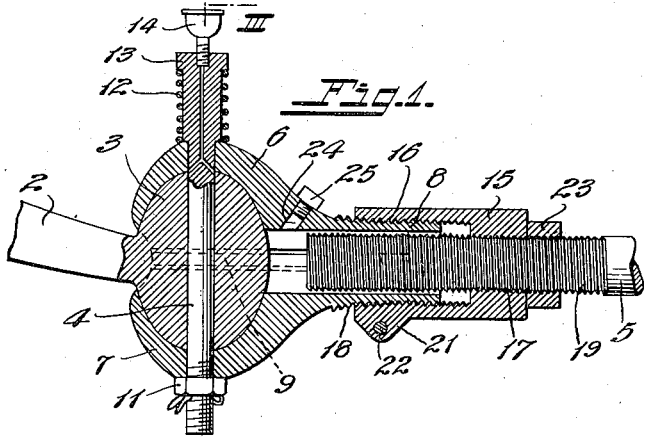
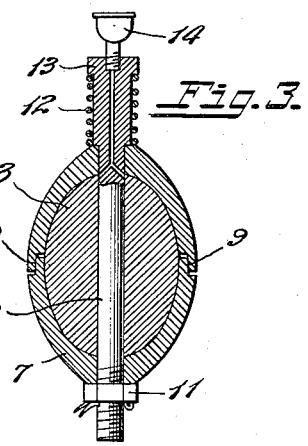
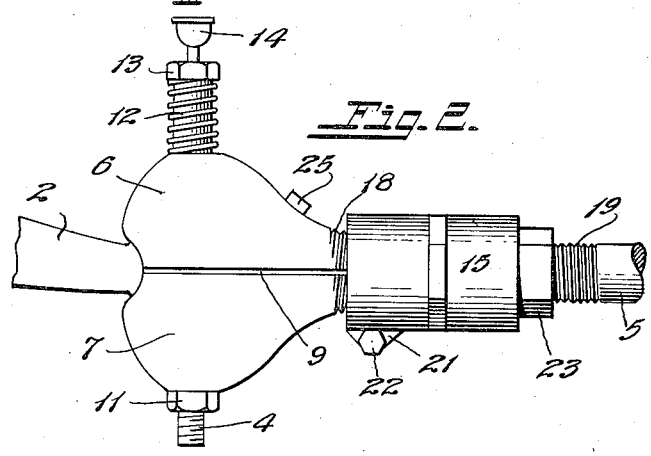
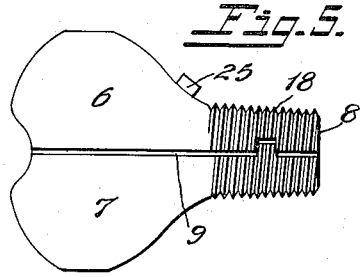
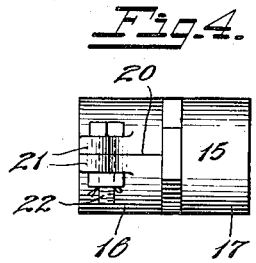
Witness
Marshall Low
Inventors
Grenville W. Van Horne
Charles L. Vibbard
By John S. Barker
Attorney

UNITED STATES PATENT OFFICE.

GRENVILLE W. VAN HORNE AND CHARLES L. VIBBARD, OF COOPERSTOWN, NEW YORK.

BALL-AND-SOCKET JOINT.

1,201,115.     Specification of Letters Patent.    Patented Oct. 10, 1916.

Application filed March 22, 1916. Serial No. 85,938.

*To all whom it may concern:*

Be it known that we, GRENVILLE W. VAN HORNE and CHARLES L. VIBBARD, citizens of the United States, residing at Cooperstown, in the county of Otsego and State of New York, have invented new and useful Improvements in Ball-and-Socket Joints, of which the following is a specification.

This invention relates to ball and socket joints, and has been designed with especial reference to use in connection with the steering mechanisms of motor vehicles, although it is not limited in its applications to this use.

In the accompanying drawings—Figure 1 is a vertical sectional view of a joint embodying our invention, portions of the two parts the joint unites being represented. Fig. 2 is a side view of the joint. Fig. 3 is a transverse sectional view taken on the line III—III of Fig. 1. Fig. 4 is a bottom plan view of the connecting nut 15 and parts immediately associated therewith. Fig. 5 is an elevation of the outer joint member with the connecting nut 15 removed.

In the accompanying drawings, 2 indicates the steering arm of a stub axle that is adapted to support the wheel of a vehicle, the axle and wheel, however, not being shown since they constitute no part of the present invention. At the end of the arm is a ball or enlargement 3, preferably ovoid in shape, and perforated on its longitudinal axis. The socket member of the joint is secured to the end of a connecting rod 5 and receives the enlargement 3, with which it articulates. The socket is formed of two parts, 6 and 7, adapted, when fitted together as represented in the drawings, to embrace the enlargement 3, and formed with a hollow stem 8. The stem is exteriorly screw-threaded to receive the nut 15 that unites it with the rod 5, and is interiorly smooth and adapted to receive the end of the rod 5 without, however, having a direct connecting engagement therewith. The plane of separation between the parts 6 and 7 of the socket preferably cuts the enlargement transversely to its longitudinal axis and coincides with the axis of the connecting rod 5. The edges of the socket-forming portions of the parts 6 and 7 are preferably rabbeted and overlap, as indicated at 9. In order to hold the parts of the socket together and prevent any shifting of one relative to the other, which would interrupt the continuity of the screw-thread upon the stem 8 thereof, and hence make it difficult to apply the nut 15, the adjacent edges of the two parts of the stem are preferably formed so as to interlock, one being recessed and the other provided with a projection that enters the said recess see Fig. 5. The socket pieces 7 and 8 are perforated to receive the pin 4 that passes through them and through the ball or enlargement 3 on the longitudinal axis of the latter. One end of this pin is screw-threaded and receives a clamping nut 11, and the other is expanded to form a seat for a coil spring 12, arranged between the head 13 of the pin and the outer face of the contiguous socket member 6. This spring operates to hold the socket members in close engagement with the ball of the joint and tends to prevent looseness of parts or rattling should the parts become worn or for other reasons not fit closely. The pin is perforated longitudinally and provided with lateral ducts to convey lubricant from a cup or receptacle 14 to the contacting surfaces of the joint.

15 designates a connecting nut for uniting the joint with the rod 5 or other part with which it is used, and which also operates to hold together the two parts of the socket member of the joint. The nut has two portions 16 and 17, each interiorly screw-threaded, the former engaging with the screw threads 18 upon the stem 8 of the socket, and the latter with the screw threads 19 at the end of the rod 5. The threads 18 and 19 are oppositely inclined, that is, one is right hand, and the other is left hand, so that the rotation of the nut in the proper direction after having been caused to engage with the said screw threads, operates to draw the parts carrying said threads toward each other. The screw-threaded portion of the stem 8 preferably tapers slightly toward the joint, so that the nut when screwed upon the stem 8 draws the socket members into close engagement with the ball or enlargement 3. That part, 16, of the nut which engages with the stem of the socket, is preferably split, as indicated at 20, in order that said part shall be yielding to a limited extent and free to expand under stress as the nut is screwed onto the enlarging part of the stem. Portions of the nut upon opposite sides of the slit 20 may, if desired, be provided with perforated lugs 21 through which passes a set screw or threaded bolt 22 adapted to draw and hold together the sections of the nut, thus maintaining the latter in very close and binding engagement with the stem 8. A lock nut 23 is mounted upon the screw-threaded portion 19 of the rod 5 and is adapted to engage with the end face of the nut 15 to hold it in place.

24 designates a duct, adapted to be closed at its outer end by a plug 25, through which lubricant may be conducted to the bore of the stem 8 adjacent to where the latter communicates with the recess in the socket occupied by the ball or enlargement 3.

The parts of the joint described are assembled and connected as follows: The two socket members, 6 and 7, are fitted over the ball or enlargement 3 and the pin 4 applied. The connecting nut 15, which has been screwed upon the end of the rod 5 for a short distance, say one inch, is then caused to engage with the hollow stem 8 of the socket member of the joint. By reason of the fact that the threads 18 and 19 are respectively right and left hand threads, as has been described, the rotation of the nut in the proper direction draws the joint and rod 5 together, the end of the latter entering the bore of the stem, which it is free to do since the latter is slightly larger in diameter than the rod. The rotation of the nut is continued until the desired adjustment of parts is attained, when the set nut 23 is screwed against the end of the nut 15 and the set bolt 22 tightened.

The ovoid form of the ball of the joint prevents the socket from turning upon the ball and hence in the nut 15, which might otherwise occur under the conditions of use to which the joint was subjected and thus disturb the adjustment of parts, or even cause sufficient movement to uncouple the joint from the rod 5.

What we claim is:—

1. A ball and socket joint in which the ball member is of ovoid shape and the socket member is formed of two parts, the plane of separation between which is transverse to the longitudinal axis of the ball member, a pin passing through the said joint on the longitudinal axis of the ball member, and a spring supported by the pin for holding together the parts of the socket member in clamping engagement with the ball member.

2. A ball and socket joint, the socket member of which is provided with a hollow stem externally screw-threaded, a rod to be connected with the joint, screw threaded at its end, and a connecting nut for uniting the stem of the joint and the rod, screw-threaded to engage with each, the threads on the said parts being respectively right and left handed, whereby rotation of the nut in the proper direction, and when in engagement with the said parts, unites them and causes the end of the rod to enter the bore of the stem.

3. A ball and socket joint, the socket member of which is provided with an externally screw-threaded hollow stem and is formed of two parts, the plane of separation extending through the said stem, a rod to be connected with the joint, screw-threaded at its end, and a nut having a portion screw-threaded in one direction for engagement with the stem, and another portion screw-threaded in the opposite direction for engagement with the rod, the nut serving to connect the stem and joint and to hold together the two parts of the socket member of the joint.

4. A ball and socket joint, the socket member of which is provided with a stem externally screw-threaded, and formed of two parts, the plane of separation between them extending longitudinally through the stem, and the two parts of the stem having interlocking engagement with each other to prevent shifting of the parts, a rod with which the joint is connected, and a connecting nut for uniting the rod and joint.

GRENVILLE W. VAN HORNE.
CHARLES L. VIBBARD.